United States Patent
Lepeska (10) Patent No.: US 8,949,719 B2
(45) Date of Patent: Feb. 3, 2015

(54) METHODS AND SYSTEMS FOR USER INTERFACE EVENT SNOOPING AND PREFETCHING

(75) Inventor: Peter Lepeska, Boston, MA (US)

(73) Assignee: ViaSat, Inc., Carlsbad, CA (US)

(*) Notice: Subject to any disclaimer, the term of this patent is extended or adjusted under 35 U.S.C. 154(b) by 1348 days.

(21) Appl. No.: 12/471,192

(22) Filed: May 22, 2009

(65) Prior Publication Data

US 2009/0293000 A1 Nov. 26, 2009

Related U.S. Application Data

(60) Provisional application No. 61/055,868, filed on May 23, 2008.

(51) Int. Cl.
*G06F 3/00* (2006.01)
*G06F 13/38* (2006.01)
*G06F 17/30* (2006.01)
*G06F 15/177* (2006.01)

(52) U.S. Cl.
CPC ........ *G06F 13/385* (2013.01); *G06F 17/30902* (2013.01)
USPC ........... 715/733; 715/735; 715/736; 715/738; 715/744; 715/748

(58) Field of Classification Search
USPC .......... 715/700, 733–747; 709/201, 208, 217, 709/227, 238; 706/201, 208, 217, 227, 238
See application file for complete search history.

(56) References Cited

U.S. PATENT DOCUMENTS

| | | | |
|---|---|---|---|
| 6,578,073 B1* | 6/2003 | Starnes et al. | 709/219 |
| 7,370,142 B2* | 5/2008 | Yasuda et al. | 711/112 |
| 7,441,154 B2* | 10/2008 | Klotz et al. | 714/39 |
| 7,685,255 B2* | 3/2010 | Amlekar et al. | 709/217 |
| 2005/0060574 A1* | 3/2005 | Klotz et al. | 713/201 |
| 2007/0025301 A1* | 2/2007 | Petersson et al. | 370/338 |
| 2008/0229023 A1* | 9/2008 | Plamondon | 711/126 |

* cited by examiner

*Primary Examiner* — Matt Kim
*Assistant Examiner* — Yongjia Pan
(74) *Attorney, Agent, or Firm* — Kilpatrick Townsend & Stockton LLP (57) ABSTRACT

The present invention relates to systems, apparatus, and methods for utilizing user interface (UI) snooping to optimize network connections. The method includes accessing, by a client proxy running on a client system, a UI events queue. The UI events queue is stored on the client system. The method further includes identifying events within the UI events queue. The identifying includes filtering the events for events to be optimized. The method further includes, based on the identified events, determining at least one command, and optimizing the at least one command, and executing the optimized command.

17 Claims, 4 Drawing Sheets

METHODS AND SYSTEMS FOR USER INTERFACE EVENT SNOOPING AND PREFETCHING

PRIORITY CLAIM

This application claims priority to U.S. Provisional Application No. 61/055,868, entitled METHODS AND SYSTEMS FOR USER INTERFACE EVENT SNOOPING AND PREFETCHING, filed on May 23, 2008, which is incorporated by reference in its entirety for any and all purposes.

FIELD OF THE INVENTION

The present invention relates, in general, to network acceleration and, more particularly, to user interface (UI) event snooping and prefetching.

BACKGROUND

Presently, network acceleration efforts are blind to user interactions at the UI level. In order to optimize and accelerate network connections, the acceleration systems will typically use predictive algorithms and techniques to determine what a user is doing or is going to do at the UI level. Accordingly, such predictions are inaccurate and flawed, and as such have limited benefit. Thus, improvements in the art are needed.

BRIEF SUMMARY

Embodiments of the present invention are directed to a method of utilizing user interface (UI) snooping to optimize network connections. The method includes accessing, by a client proxy running on a client system, a UI events queue. The UI events queue is stored on the client system. The method further includes identifying events within the UI events queue. The identifying includes filtering the events for events to be optimized. The method further includes, based on the identified events, determining at least one command, and optimizing the at least one command, and executing the optimized command.

Another embodiment is directed to a system for utilizing user interface (UI) snooping to optimize network connections. The system includes a client system which includes a client proxy. The client proxy is configured to access a UI events queue. The UI events queue is stored on the client system. The client proxy is further configured to identify events within the UI events queue which are optimizable, and based on the identified events, to determine at least one command. The proxy client is further configured to optimize the at least one command, and to execute the optimized command.

The system further includes a proxy server in communication with the client system. The proxy server is configured to receive the optimized command and transmit the optimized command. The system further includes a content server in communication with the proxy server. The content server is configured to process the optimized command and transmit the requested content to the client system.

In an alternative embodiment, a machine-readable medium is described. The machine-readable medium includes instructions for accessing, by a client proxy running on a client system, a UI events queue. The UI events queue is stored on the client system. The machine-readable medium further includes instructions for identifying events within the UI events queue. The identifying includes filtering the events for events to be optimized. The machine-readable medium further includes instructions for, based on the identified events, determining at least one command, and instructions for optimizing the at least one command, and executing the optimized command.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The ensuing description provides exemplary embodiment(s) only and is not intended to limit the scope, applicability or configuration of the disclosure. Rather, the ensuing description of the exemplary embodiment(s) will provide those skilled in the art with an enabling description for implementing an exemplary embodiment. It should be understood that various changes may be made in the function and arrangement of elements without departing from the spirit and scope as set forth in the appended claims.

Aspects of the disclosure relate to snooping a user interface (UI) queue in order to identify commands in which a user is executing. In one embodiment, snooping refers to identifying useful information in a UI queue regarding commands the user intends to execute, before the commands are actually executed. Typically, for example, if a user desires to open a file, the user will double click on the file, the associated application is identified and the file is opened within the identified application. If the file being accessed is located on a remote server or other computer, the file content is first transferred to the requesting computer before it can be opened. Without knowing the intent of the user, the blocks of data being transferred between the requesting computer and the serving computer can be difficult to utilize for optimization and acceleration of a network. However, if it is known which command, file, file type, application, etc. is associated with the blocks of data, then optimization and acceleration can be performed with a greater degree of success.

Hence, the present invention utilizes the information (or events) included in the UI events queue to enhance optimization and acceleration of network based commands and file transfers. Accordingly, by identifying what the user has done at the presentation layer (i.e., via the UI), then the blocks of data being transferred over the network can be identified as being associated with a command or file, and optimization of the command or file transfer can be performed.

Figure 1:
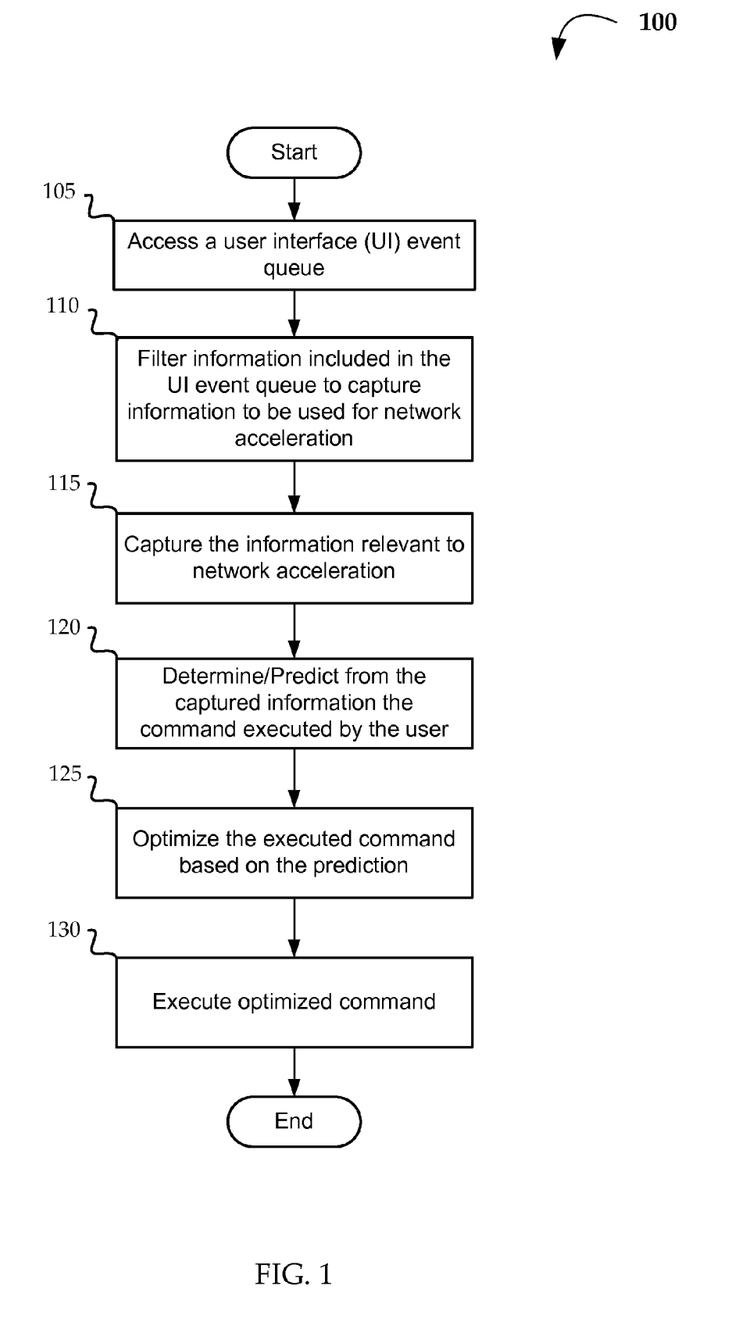
FIG. 1 is a flow diagram illustrating a method for implementing user interface (UI) event snooping and prefetching, according to embodiments of the present invention.

Turning now to FIG. 1, which illustrates a method 100 for utilizing UI event snooping in order to enhance optimization and acceleration of network traffic and file transfers. At process block 105, the UI events queue may be accessed by, for example, a client proxy running on a client system. In one embodiment, the UI events queue includes UI events which correspond to interface actions performed by the user with interfacing devices (e.g., a mouse, a keyboard, a touchpad, a stylus, a microphone, etc.). Each mouse click, keystroke, audio command, etc. is logged within the UI events queue. The commands are typically queued in the order received and the client system's operating system executes the commands in that order one after another. Since, in the traditional network layer model (or network stack), layers typically know little or no information about the layers above and below, this UI information (i.e., presentation layer information) proves extremely useful to the other various network layers (i.e., application layer, physical layer, transport layer, etc.). In other words, when a layer of the network stake has information about a layer above or below that layer, then optimization of network traffic can be greatly increased which can, among other things, provide faster data transfer rates, increase bandwidth, minimization of congestion and dropped packets, increase overall network acceleration.

An additional benefit of utilizing UI event snooping in network acceleration is that it is transparent to the user. Transparent means that the users are unaware that their UI events are being snooped and so the snooping does not affect the user's interaction with the computing device. Hence, network communications between the user's device and a content server can be optimized without the user knowledge that such optimization is occurring.

In an alternative embodiment, a UI event snooping program may be implemented. Such a program (or application) may be configured to run on a client system to capture (or gather) information from the operating system's UI event queue. The snooping application may then be configured to transmit the UI events to, for example, the client proxy, and the client proxy can then analyze each event. At process block 110, such an analysis may include filtering (or identifying) UI events which may be utilized in network optimization and/or acceleration. For example, some events within the UI events queue may be of little or no use in network acceleration. Such events may include, for example, a right-mouse click to check the properties of a file, keystrokes used to type words in a text document, etc. As such, these events would be filtered out as irrelevant to optimizing or accelerating network traffic.

Alternatively, many UI events are useful when attempting to accelerate a network connection. For example, a double-click on a remote file in order to open that file, a click on an email message send icon, a folder delete of a folder on a remote server, etc. As such, these UI events may accordingly be captured as being relevant to network acceleration (process block 115). In one embodiment, such captured events may be stored in a data store, a table, a matrix, etc. for access by, for example, the client proxy. In a further embodiment, as the UI events are being filtered (or parsed), each event or group of events may be compared to an event dictionary. The event dictionary may include information which can be used to identify UI events relevant to network acceleration. For example, certain UI events may provide a pseudo signature which would facilitate identification of the action (or executed application) associated with the UI event(s). Accordingly, a number of UI events may be mapped in the dictionary to identify such actions, application executions, etc.

One example may be a drag and drop (or move) of a file folder. Typically, when a drag and drop is viewed across the network connection, only blocks of data are seen going between the client system and the content server. The blocks of data are seemingly random when simply viewed at the network connection layer. However, such blocks, when viewed in connection with snooped UI events, can be more useful for optimization and acceleration. For example, if the UI events of a remote folder being clicked on and then dragged to a local folder are identified from the UI events queue, then a folder move (or a drag and drop) is deduced. Furthermore, the UI event also identifies the path of the folder being moved and the destination of the folder. From this information, a determination that the user is performing a folder move is made (process block 120).

Accordingly, the client proxy, for example, can utilize this information to download the entire folder and optimally serve the folder to the client system (process block 125). In other words, the folder move command can be intercepted by the client proxy and instead of a non-accelerated folder move initiated by the client system, the client proxy can execute an accelerated (optimized) transfer of the folder move (process block 130). Hence, in one embodiment, the snooped UI events provide the client proxy with hints or clues as to which commands the client system is executing in order to replace the client system's commands and requests with optimized commands and requests.

In an alternative embodiment, the UI events captured from the UI events queue may simply provide additional information which can be used to make better and more informative predictions and decisions related to the user's intentions. In other words, the captured UI events can be used to provide a "hint" or insight into the user's actions. As a hint, the exact execution and/or command may not be known, but any predictions made would be significantly more accurate when utilizing the captured information.

For example, assuming that the a number of UI events are captured, and based on the "signature" created by the combination of the events, it is determined that one of a delete, a move, or an open command is going to likely be executed. However, as additional UI events are captured, the potential commands may be narrowed down to, for example, either a delete or a move command. Accordingly, based on the snooped UI events, the odds of predicting correctly have been increased significantly. In a further embodiment, capturing of even more UI events may allow the commands to be narrowed even further to the exact command of, for example, a move command. Nonetheless, without knowing the exact command or operation, the "hint(s)" provided facilitate improved predictions.

In a further embodiment, the information gathered from the snooped UI events may provide insight as to which content to pre-fetch, to cache, how long to hold the content in the cache, etc. Essentially, the snooped UI events provide additional information which can be used to more effectively and efficiently predict a user's actions. The UI events do not necessarily have to narrow the user's actions down to an exact command or execution, but can simply provide a better picture of what the user is doing. In other words, the question should be asked when analyzing the snooped UI events: what do these UI events indicate about the user's intentions?

Another example may be that the client system is attempting to open a Microsoft Visio document from a content server. When a Visio document is opened the blocks of data which store the document are accessed in a random order. This is different from most types of application documents which are accessed in sequential order. Thus, since Visio documents are not opened in sequential order, without the additional information gleaned from the UI events queue, prefetching of such documents does not work properly.

For example, a typical the Visio document may be downloaded from a content server to the client system in ten data blocks, and the first data block to be downloaded may actually be the fifth block in the sequence of ten. Accordingly, in order to accelerate the downloading of the Visio document, the data starting at the fifth block is downloaded (which with most file types is the first block) under the assumption that that block is the first block. The next block is the seventh block, then the second block, and so forth until all ten blocks are transferred. However, since the blocks are out of order, the proxy server performing the acceleration must start and stop prefetching until more bytes of data than the total size of the Visio document have been prefetched, which is essentially the opposite of optimization or acceleration.

However, when, for example, a Visio document is clicked-on to be opened the UI events queue logs the path of the file to be executed and the associated application. Accordingly, the proxy server would simply begin downloading data starting at the Visio document file path location until the entire file has been downloaded. This is done irrespective of the random order in which the document would have been downloaded. As such, by snooping the UI events, the Visio document is able to be downloaded (prefetched) properly in sequential order without downloading more than the total file size. The Visio file format is merely used by way of explanation; nonetheless, other file types which display the same or similar characteristics may be utilized.

In a further embodiment, acceleration related to a "click-off" or canceled action may benefit from snooping UI events. For example, when a hyperlink on a webpage within a web browser is clicked, the content of the webpage associated with the hyperlink begins to be prefetched and cached data is checked to determine if the webpage's content has previously been downloaded. However, if the user clicks on the hyperlink then quickly realizes that a mistake was made and clicks on another hyperlink, the damage has already been done. In other words, the proxy server has already begun to prefetch the webpage content which ultimately will not be used by the user because of the cancellation (or click-off). Accordingly, network, storage, and processing resources are wasted and the transfer rate is not accelerated.

However, based on the snooping of the UI event queue, such a canceled action or click-off can be easily determined prior to pre-fetching any data. The UI events queue would include, for example, a click on a hyperlink, then a click on a cancel icon or a click on another hyperlink right after the initial hyperlink click. Thus, from this information, the proxy server can be instructed not to begin prefetching and checking the cache for the initially clicked webpage (which stops the wasting of valuable resources). Hence, as can be seen from the above examples, knowing a user's actions at the presentation layer by snooping UI events provide an acceleration server (or proxy server) with valuable information which helps to increase its acceleration and optimization capability.

Figure 2:
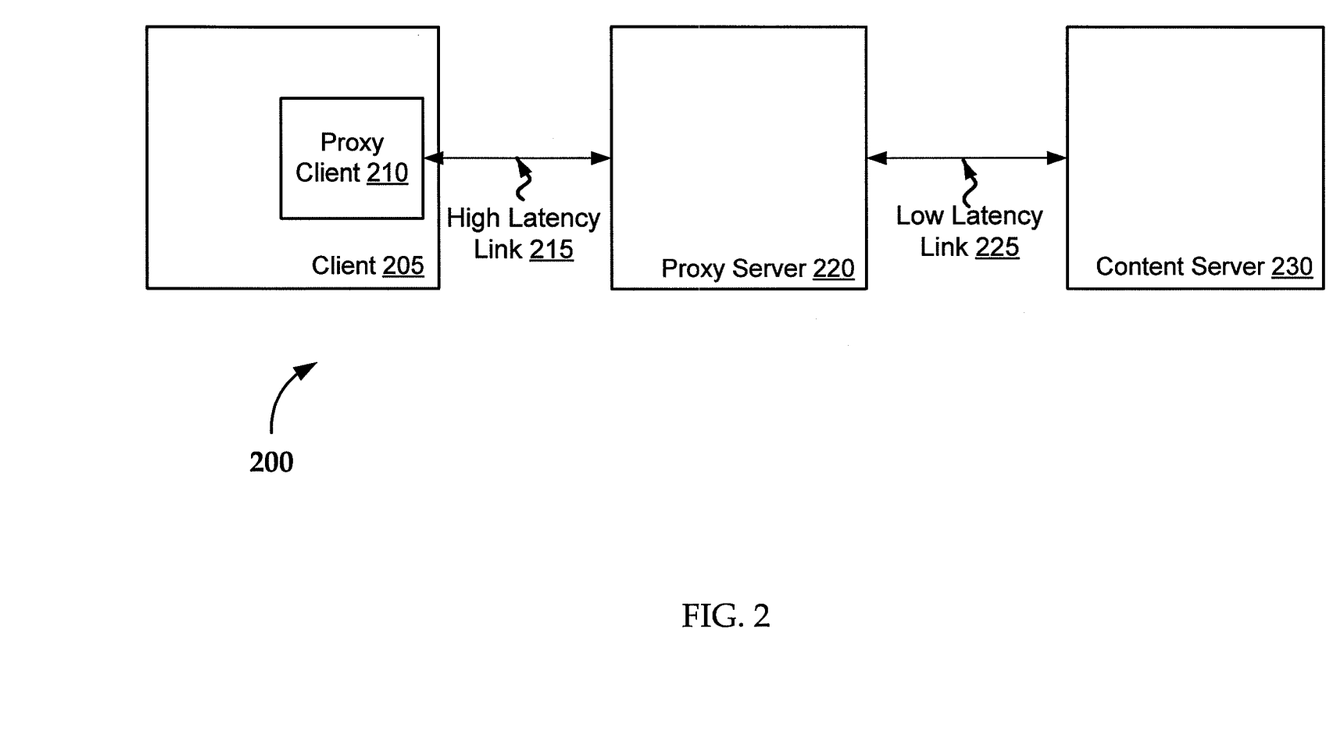
FIG. 2 is a block diagram illustrating a system for implementing user interface (UI) event snooping and prefetching, according to one embodiment of the present invention.

Referring now to FIG. 2, which illustrates a system 200 for utilizing UI event snooping in order to enhance optimization and acceleration of network traffic and file transfers. In one embodiment, system 200 may include a client 205, which further includes a proxy client 210. Client 205 may be configured to receive input from a user interface via various input devices (e.g., a keyboard, a mouse, a touchpad, a stylus, a trackball, a microphone, etc.). The input may be in connection with a web-based application (e.g., a web browser, an FTP interface, an email application, etc.) or may be in connection with file viewing programs or any other programs which utilize a network connection.

As discussed above, when UI events occur a UI events queue is maintained by client 205's operating system. In one embodiment, client proxy 210 may be configured to snoop that UI events queue in order to determine, at the presentation layer, (i.e., at the UI) the user's true intentions. Client proxy 210 is configured to gather the UI events from the queue, filter out unimportant events, and analyze the important (or useful) events. Based on the information and analysis of the snooped UI events, proxy client 210 is capable of accelerating the network traffic between client 205 and proxy server 220 over network connection 215. In one embodiment, network connection 215 is a high latency and/or a low bandwidth connection (e.g., a satellite connection, a cellular connection, a dial-up connection, etc.). Hence, acceleration and optimization of network connection 215 is advantageous.

In one embodiment, as UI events are snooped, filtered, and analyzed, client proxy 210 utilizes the information to accelerate connection 215. Proxy server 220 then forwards the network traffic received on to content server 230 via network connection 225. In one embodiment, network connection 225 is a low latency and/or high bandwidth connection (e.g., a cable connection, a T1 connection, an asynchronous digital subscriber line (ADSL), a DSL connection, etc.). Accordingly, the slow connection (i.e., network connection 215) is accelerated and the fast connection (i.e., network connection 225) remains relatively untouched. However, the transfer rate between client 205 and content server 230 is greatly improved.

Figure 3:
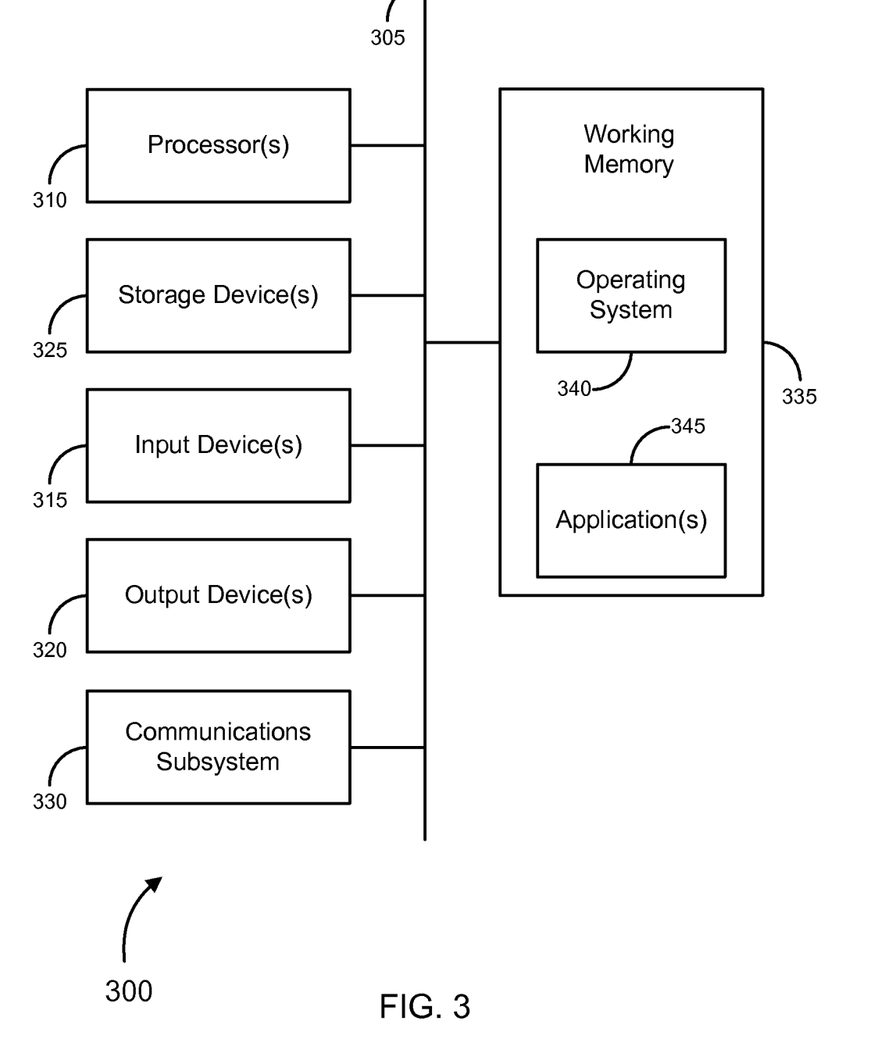
FIG. 3 is a generalized schematic diagram illustrating a computer system, in accordance with various embodiments of the invention.

FIG. 3 provides a schematic illustration of one embodiment of a computer system 300 that can perform the methods of the invention, as described herein, and/or can function, for example, as any part of client 205, content server 230, etc. of FIG. 2. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation dynamic memory, such as the working memory 335. Transmission media includes coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation, radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
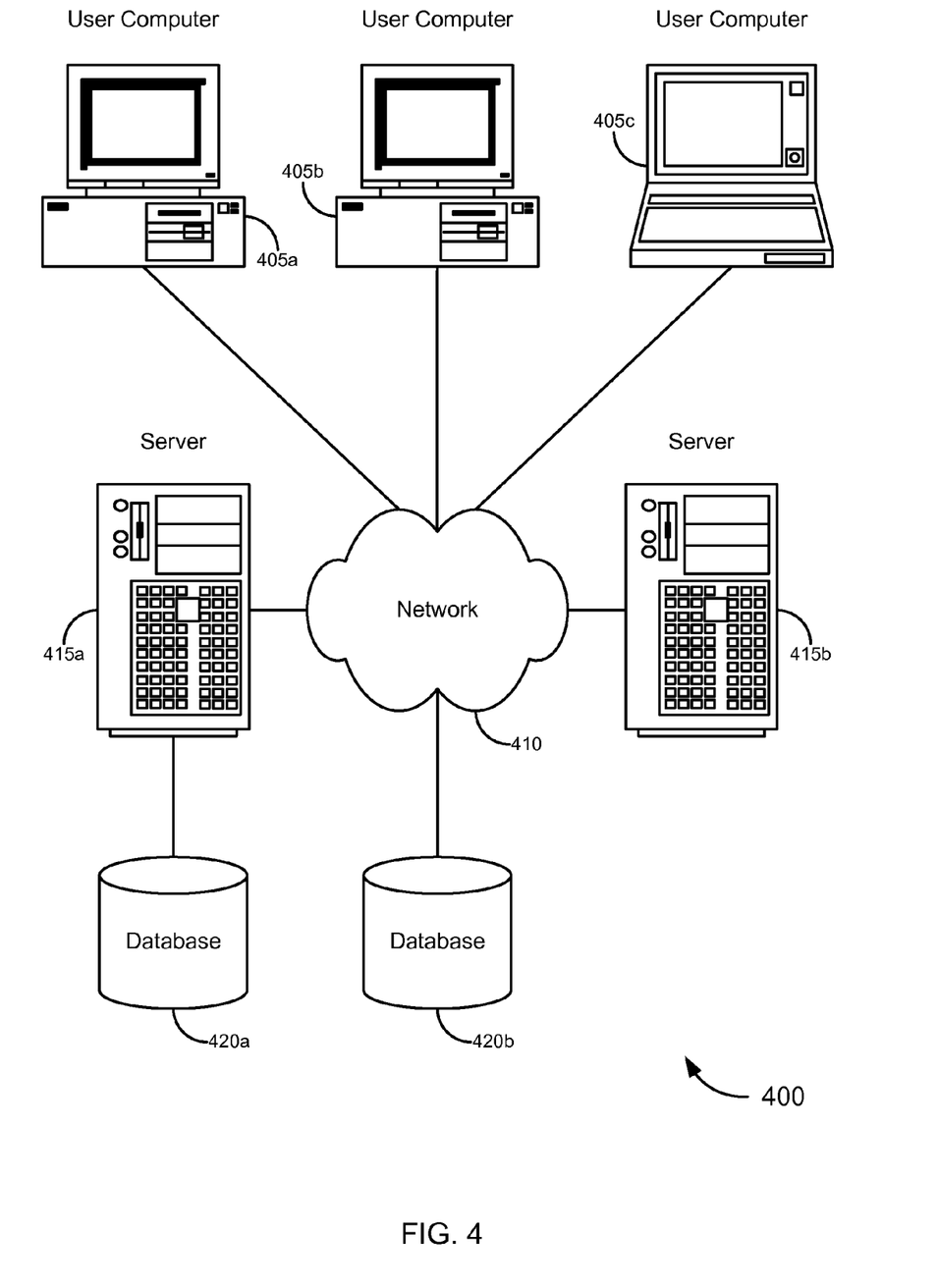
FIG. 4 is a block diagram illustrating a networked system of computers, which can be used in accordance with various embodiments of the invention.

A set of embodiments comprises systems for dynamic routing. In one embodiment, proxy server 220, content server 230, etc. of FIG. 2, may be implemented as computer system 300 in FIG. 3. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 405 and/or another server 415. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as the database can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for optimizing network connections, the method comprising:
   accessing, by a proxy client running on a client system, a UI events queue, wherein the UI events queue is stored on the client system and functions with an operating system of the client system, such that events within the UI event queue are accessed and executed by the operating system;
   identifying events within the UI events queue, wherein the identifying includes filtering the events for events to be optimized;
   based on the identified events, determining at least one command;
   optimizing the at least one command; and
   executing the optimized command,
   wherein identifying events within the UI events queue comprises interpreting mouse inputs as one or more of the following: a directory move, a file move, a directory delete, a file delete, a file open, an application open, an application close, and a file transfer, in order to determine the at least one command, and
   wherein optimizing the at least one command comprises accelerating the at least one command using the proxy client.

2. A method for optimizing network connections as in claim 1, further comprising parsing the events within the UI events queue.

3. A method optimizing network connections as in claim 2, further comprising comparing the parsed events to a commands dictionary to determine a type of command.

4. A method for optimizing network connections as in claim 3, wherein the commands dictionary is configured to provide translation of events into commands.

5. A method for optimizing network connections as in claim 1, wherein the optimizing of the at least one command includes at least one or more of the following: reducing network traffic associated with executing the at least one command, reducing sub-commands associated with the at least one command, and reducing round trip time (RTT) associated with the at least one command.

6. A method for optimizing network connections as in claim 1, further comprising filtering information included in the UI event queue in order to capture information used for network acceleration.

7. A method for optimizing network connections as in claim 6, wherein the events within the UI events queue comprises a log of user mouse clicks.

8. The method of claim 1 wherein identifying events within the UI events queue comprises identifying the events prior to execution of the events by the operating system.

9. The method of claim 1 wherein the events within the UI events queue comprise presentation layer events and wherein the at least one command comprises an application layer command or a network layer command.

10. The method of claim 1 wherein the events within the UI events queue comprises a mouse click associated with a hyperlink; and wherein optimizing the at least one command comprises prefetching an object associated with the hyperlink using the proxy client.

11. A system for optimizing network connections, the system comprising:
    a client system including a proxy client configured to: access a UI events queue stored on the client system, to identify events within the UI events queue which are optimizable, based on the identified events, to determine at least one command, to optimize the at least one command, and to execute the optimized command, wherein the UI events queue functions with an operating system of the client system, such that events within the UI event queue are accessed and executed by the operating system;
    a proxy server in communication with the client system configured to receive the optimized command and transmit the optimized command; and
    a content server in communication with the proxy server, the content server configured to process the optimized command and transmit the requested content to the client system,
    wherein the client system is further configured to identify events within the UI events queue by interpreting mouse inputs as one or more of the following: a directory move, a file move, a directory delete, a file delete, a file open, an application open, an application close, and a file transfer, in order to determine the at least one command, and
    wherein the client system is configured to optimize the at least one command by accelerating the at least one command using the proxy client.

12. A system for optimizing network connections as in claim 11, wherein the content server comprises one or more of the following: a file server, a web server, a mail server, and a FTP server.

13. A system for optimizing network connections as in claim 11, wherein the client system and the proxy server are in communication via a high latency link.

14. A non-transitory machine-readable medium for optimizing network connections, including sets of instructions stored thereon which, when executed by a machine, cause the machine to:
    access, by a proxy client running on a client system, a UI events queue, wherein the UI events queue is stored on the client system and functions with an operating system of the client system, such that events within the UI event queue are accessed and executed by the operating system;
    identify events within the UI events queue, wherein the identifying includes filtering the events for events to be optimized;
    based on the identified events, determine at least one command;
    optimize the at least one command; and
    execute the optimized command,
    wherein the sets of instructions when executed cause the machine to identifying events within the UI events queue by interpreting mouse inputs as one or more of the following: a directory move, a file move, a directory delete, a file delete, a file open, an application open, an application close, and a file transfer, in order to determine the at least one command, and
    wherein the sets of instructions when executed cause the machine to optimize the at least one command by accelerating the at least one command using the proxy client.

15. A machine-readable medium for optimizing network connections as in claim 14, wherein the sets of instructions which, when further executed by the machine, cause the machine to parse the events within the events queue.

16. A machine-readable medium for optimizing network connections as in claim 15, wherein the sets of instructions which, when further executed by the machine, cause the machine to compare the parsed events to a commands dictionary to determine a type of command.

17. A machine-readable medium for optimizing network connections as in claim 16, wherein the commands dictionary is configured to provide translation of events into commands.

* * * * *